US010245718B2

(12) United States Patent
Glauning

(10) Patent No.: US 10,245,718 B2
(45) Date of Patent: Apr. 2, 2019

(54) PROTECTION APPARATUS FOR A MACHINE TOOL, AT LEAST FOR PROTECTING A WORKPIECE SURFACE AGAINST OVERHEATING

(71) Applicant: Robert Bosch GmbH, Stuttgart (DE)

(72) Inventor: Rainer Glauning, Leinfelden-Echerdingen (DE)

(73) Assignee: Robert Bosch GmbH, Stuttgart (DE)

( * ) Notice: Subject to any disclaimer, the term of this patent is extended or adjusted under 35 U.S.C. 154(b) by 513 days.

(21) Appl. No.: 14/957,218

(22) Filed: Dec. 2, 2015

(65) Prior Publication Data
US 2016/0151872 A1 Jun. 2, 2016

(30) Foreign Application Priority Data
Dec. 2, 2014 (DE) .................. 10 2014 224 570

(51) Int. Cl.
*B25F 5/00* (2006.01)
*B23Q 11/00* (2006.01)
*B23Q 17/09* (2006.01)

(52) U.S. Cl.
CPC .......... *B25F 5/008* (2013.01); *B23Q 11/0046* (2013.01); *B23Q 17/0985* (2013.01)

(58) Field of Classification Search
CPC ........ B23Q 11/00; B23Q 11/14; B23Q 15/12; B23Q 17/09; B25F 5/00
USPC .......... 173/1, 2, 3, 4, 46; 30/415; 144/252.1; 451/453
See application file for complete search history.

(56) References Cited

U.S. PATENT DOCUMENTS

| 4,438,598 A * | 3/1984 | Wohlmuth | B24B 49/14 374/131 |
| 4,449,085 A * | 5/1984 | Gomoll | B23B 25/06 318/471 |
| 5,878,824 A * | 3/1999 | Mercer | E21B 7/06 175/24 |
| 6,220,799 B1 * | 4/2001 | Okutani | B23Q 1/012 29/26 A |
| 8,154,155 B2 * | 4/2012 | Seidel | B23D 59/001 307/326 |

FOREIGN PATENT DOCUMENTS

| DE | 10 2008 044 401 A1 | 6/2010 |
| DE | 20 2009 018 270 U1 | 10/2011 |
| DE | 20 2013 007 344 U1 | 11/2013 |
| DE | 10 2012 222 321 A1 | 6/2014 |
| DE | 10 2013 202 964 A1 | 9/2014 |
| GB | 2 112 547 A | 7/1983 |

* cited by examiner

*Primary Examiner* — Nathaniel C Chukwurah
(74) *Attorney, Agent, or Firm* — Maginot, Moore & Beck LLP

(57) ABSTRACT

A protection apparatus for a machine tool, at least for protecting a workpiece surface against overheating, includes at least one sensor unit and at least one evaluation unit. The sensor unit has at least one sensor element. The sensor element detects at least one characteristic variable of a fluid flow provided for transporting material removed from a workpiece. The evaluation enables identification of at least one temperature of a workpiece surface of the workpiece to be machined via the machine tool based at least in part upon the at least one characteristic variable detected via the sensor unit.

13 Claims, 2 Drawing Sheets

PROTECTION APPARATUS FOR A MACHINE TOOL, AT LEAST FOR PROTECTING A WORKPIECE SURFACE AGAINST OVERHEATING

This application claims priority under 35 U.S.C. § 119 to patent application no. DE 10 2014 224 570.2, filed on Dec. 2, 2014 in Germany, the disclosure of which is incorporated herein by reference in its entirety.

BACKGROUND

GB 2 112 547 A already discloses a protection apparatus for a machine tool, at least for protecting a workpiece surface against overheating. In said document, the protection apparatus comprises a sensor unit which has at least one sensor element, and comprises an evaluation unit by means of which it is possible to identify a temperature of a workpiece surface of a workpiece which can be machined by means of the machine tool on the basis of at least one characteristic variable which is detected by means of the sensor unit. The sensor element, which is provided for detecting a temperature and is electrically connected to the evaluation unit, is arranged outside a tool, wherein the sensor element is protected, in particular, against being influenced by a fluid flow.

SUMMARY

The disclosure proceeds from a protection apparatus for a machine tool, at least for protecting a workpiece surface against overheating, comprising at least one sensor unit which comprises at least one sensor element, and comprising at least one evaluation unit by means of which it is possible to identify at least a temperature of a workpiece surface of a workpiece which can be machined by means of the machine tool at least on the basis of at least one characteristic variable which is detected by means of the sensor unit.

It is proposed that the sensor element detects at least one characteristic variable of a fluid flow which is provided for transporting material which has been removed from a workpiece. "Provided" is intended to be understood to mean, in particular, specially designed, specially programmed and/or specially equipped. The statement that an element and/or a unit are/is provided for a particular function is intended to be understood to mean, in particular, that the element and/or the unit perform(s) and/or execute(s) said particular function in at least one use and/or operating state. The protection apparatus is preferably provided at least for monitoring a temperature of a workpiece surface during machining of a workpiece by means of an insertion tool which is arranged on a tool holder of the machine tool. The insertion tool can be in the form of a grinding tool (grinding disk, grinding belt or the like), in the form of a polishing tool or the like.

The sensor element preferably detects at least one characteristic variable of a fluid flow during machining of a workpiece which can be machined by means of the insertion tool which is arranged on the tool holder of the machine tool. The fluid flow is preferably in the form of an air flow which is provided for transporting material which has been removed from the workpiece. The fluid flow can be in the form of suction-intake air flow, in the form of discharge air flow or the like which is provided for transporting material which has been removed from the workpiece, in particular for transporting material which has been removed from the workpiece during machining of a workpiece by means of the insertion tool which is arranged on the tool holder of the machine tool. Here, "characteristic variable of a fluid flow" is intended to be understood to mean, in particular, a characteristic variable which defines the fluid flow and/or on which the fluid flow is dependent and/or which is dependent on the fluid flow. The characteristic variable of the fluid flow can be in the form of the temperature of the fluid flow, in the form of the temperature of workpiece particles which are transported by means of the fluid flow, in the form of a change in the temperature of the fluid flow, in the form of a flow rate of the fluid flow, in the form of a volumetric flow rate of the fluid flow, in the form of a rotation speed of a drive unit for generating the fluid flow, in the form of a current of a drive unit for generating the fluid flow, in the form of a fan impeller rotation speed of a fan unit for generating the fluid flow, or in the form of another characteristic variable of the fluid flow which would appear to be expedient to a person skilled in the art. The fluid flow can be generated preferably by means of a suction-removal apparatus of the machine tool. The suction-removal apparatus of the machine tool can have a fan unit, a turbine unit, a pump unit or the like for this purpose, said unit being provided for generating a fluid flow for transportation purposes, in particular for suction-intake and/or suction-removal of workpiece particles which are removed during processing of a workpiece, in a manner which is already known to a person skilled in the art. The suction-removal apparatus of the machine tool can be driven preferably by means of the drive unit which drives the tool holder of the machine tool. However, it is also feasible for the suction-removal apparatus of the machine tool to comprise a separate drive unit for generating the fluid flow. In an alternative design, it is also feasible for the fluid flow to be able to be generated by an external suction-removal apparatus, in particular an external vacuum cleaner, which apparatus/vacuum cleaner can form a fluidic connection with the machine tool or with the suction-removal apparatus by means of a nozzle element of the machine tool or of the suction-removal apparatus of the machine tool.

The evaluation unit is preferably provided at least for extrapolation in order to identify a temperature of a workpiece surface of a workpiece which can be machined by means of the machine tool. The evaluation unit preferably has at least one evaluation function, for example an evaluation algorithm, for evaluating the characteristic variable which is detected by means of the sensor unit. The evaluation function is preferably provided for identifying a temperature of a workpiece surface of a workpiece, which can be machined by means of the machine tool, as a result of comparing detected characteristic variables with characteristic variables which are stored in a memory unit of the evaluation unit. However, it is also feasible for the evaluation unit to have another function which would appear to be expedient to a person skilled in the art and by means of which a temperature of a workpiece surface of a workpiece which can be machined by means of the machine tool can be identified. The protection apparatus is preferably in the form of a protection apparatus for a machine tool, in particular in the form of a protection apparatus for a handheld machine tool.

A workpiece surface of a workpiece which can be machined by means of the machine tool can advantageously be reliably protected against overheating by means of the design of the protection apparatus according to the disclosure. In addition, clogging of an insertion tool, in particular of a grinding tool, with workpiece particles when a workpiece surface of a workpiece which can be machined by means of the machine tool begins to melt can advantageously be at least largely prevented. Therefore, precise machining of workpieces can advantageously be made possible. In addition, a long service life of insertion tools can advantageously be made possible.

The sensor element advantageously detects at least a temperature of the fluid flow and/or a change in the temperature of the fluid flow. The sensor element is preferably in the form of a temperature sensor. The sensor element can be in the form of a negative temperature coefficient thermistor element, in the form of a positive temperature coefficient thermistor element, in the form of a semiconductor temperature sensor element, in the form of a transistor which is connected as a diode, in the form of a heat sensor element with crystal oscillator, in the form of a thermocouple which converts a temperature difference into an electrical voltage using the Seebeck effect, in the form of a pyroelectric temperature sensor element, in the form of a bimetallic sensor element, in the form of a thermal radiation detection element, in the form of a Curie-effect temperature element, in the form of a fiber-optic temperature sensor element or as a further sensor element which would appear to be expedient to a person skilled in the art, said sensor element being provided for detecting a temperature and/or a change in temperature. A protection apparatus for monitoring before overheating can advantageously be made possible in a cost-effective manner by means of the design according to the disclosure.

It is further proposed that the sensor unit has at least one further sensor element which detects a volumetric flow rate characteristic variable of the fluid flow. Here, a "volumetric flow rate characteristic variable" is intended to be understood to mean, in particular, a characteristic variable which defines a volumetric flow rate of the fluid flow and/or on which the volumetric flow rate is directly or indirectly dependent. The volumetric flow rate characteristic variable can be in the form of a flow rate of the fluid flow, in the form of a volumetric flow rate of the fluid flow, in the form of a rotation speed of a drive unit for generating the fluid flow, in the form of a current of a drive unit for generating the fluid flow, in the form of a fan impeller rotation speed of a fan unit for generating the fluid flow or in the form of another volumetric flow rate characteristic variable which would appear to be expedient to a person skilled in the art. The further sensor element is preferably in the form of a flow sensor. The further sensor element is preferably provided at least for detecting a flow rate of the fluid flow. Reliable protection against overheating of a workpiece surface can advantageously be achieved by means of the design according to the disclosure. In addition, comparison between two detected values for adjusting detected values can advantageously be made possible in order to enable measurement with a high degree of reliability in a particularly advantageous manner.

In addition, it is proposed that the protection apparatus comprises at least one open-loop and/or closed-loop control unit which actively influences at least one motor control system, in particular of the machine tool and/or of an external suction-removal apparatus, depending on at least one characteristic variable which is detected by means of the sensor unit. An "open-loop and/or closed-loop control unit" is intended to be understood to mean, in particular, a unit with at least one control electronics system. A "control electronics system" is intended to be understood to mean, in particular, a unit comprising a processor unit and comprising a memory unit and also having an operating program which is stored in the memory unit. The open-loop and/or closed-loop control unit can comprise the evaluation unit, or the evaluation unit can be formed separately from the open-loop and/or closed-loop control unit and be connected, so as to transmit data and/or signals, to the open-loop and/or closed-loop control unit by means of a communication interface for exchanging electronic data and/or electrical signals. The open-loop and/or closed-loop control unit is preferably provided for actively intervening in the motor control system when a limit value, in particular a temperature limit value and/or a temperature gradient limit value, are/is reached, exceeded and/or undershot. The open-loop and/or closed-loop control unit is preferably provided for influencing, in particular reducing or increasing, a rotation speed of the drive unit of the machine tool, of a drive unit of the suction-removal apparatus for driving the fan unit of the suction-removal apparatus of the machine tool and/or of a drive unit of the external suction-removal apparatus at least depending on at least one characteristic variable which is detected by means of the sensor unit. However, it is also feasible for the open-loop and/or closed-loop control unit to be provided for actively braking the drive unit of the machine tool, of a drive unit of the suction-removal apparatus for driving the fan unit of the suction-removal apparatus of the machine tool and/or of a drive unit of the external suction-removal apparatus at least depending on at least one characteristic variable which is detected by means of the sensor unit. Overheating of and/or damage to a workpiece surface and/or clogging of an insertion tool with workpiece particles which have been removed can advantageously be largely avoided and/or reduced by means of the design according to the disclosure.

Furthermore, it is proposed that the protection apparatus has at least one output unit for outputting at least one item of information depending on at least one characteristic variable which is detected by means of the sensor unit. The output unit can be in the form of a haptic, acoustic and/or optical output unit. The output unit preferably comprises at least one output element which is arranged on a housing unit of the machine tool and is provided for outputting at least one item of information. The output element can be in the form of a display, in the form of a touch-sensitive display, in the form of a loudspeaker, in the form of an oscillation generator (in addition to the drive unit or integrally with the drive unit as a result of pulsing of the drive unit), in the form of a lighting element (LED, light bulb or the like) or in the form of another output element which would appear to be expedient to a person skilled in the art. The output unit can preferably be subjected to open-loop and/or closed-loop control at least depending on at least one characteristic variable which is detected by means of the sensor unit. In addition, the output unit can be integrally formed with an input unit of the machine tool, for example in the case of a design of the output unit in the form of a touch-sensitive display, in the case of a design of the output unit in the form of a voice-control input and/or voice-control output unit or the like. Information can advantageously be output to an operator by means of the design according to the disclosure, it therefore being advantageously possible to inform said operator about imminent overheating. It is feasible for operating instructions, in addition to warning instructions, to be advantageously output by means of the output unit, said operating instructions making a possible manner of operation possible for an operator by means of the output unit. In this case, the manner of operation can be output in an acoustic, haptic and/or optical manner, for example by means of a soundtrack, by means of a video, by means of an augmented-reality operating instruction or the like. Therefore, a high level of operator convenience can advantageously be achieved.

It is further proposed that the protection apparatus has at least one communication unit for communicating with at least one external unit. The communication unit is preferably in the form of a wireless communication unit. In this case, the communication unit can be in the form of a WLAN communication unit, in the form of a Bluetooth communication unit, in the form of a radio communication unit, in the form of an RFID communication unit, in the form of an NFC unit, in the form of an infrared communication unit, in the form of a mobile radio system communication unit, in the form of a ZigBee communication unit or the like. The communication unit is particularly preferably provided for bidirectional data transmission. In an alternative design, the communication unit is in the form of a wired communication unit, for example an LAN communication unit, in the form of a USB communication unit, in the form of a powerline communication unit, in the form of a CAN bus communication unit, in the form of an Ethernet communication unit, in the form of a twisted-pair cable communication unit (CAT5 or CAT6) or the like. However, it is also feasible for the communication unit to be provided for wireless and for wired communication as an alternative to wireless or to wired communication. Here, the term "transfer" is intended to define, in particular, transmission and/or reception of data, in particular electronic data. Communication by the machine tool with an external suction-removal apparatus, in particular a vacuum cleaner, and/or with an external unit, for example a smartphone, a tablet or the like, by means of which the protection apparatus, in particular at least one parameter of the protection apparatus, can be set, can be subjected to open-loop control and/or can be subjected to closed-loop control, can advantageously be made possible by means of the design according to the disclosure. It is feasible for the open-loop and/or closed-loop control unit to subject the external suction-removal apparatus to open-loop control and/or closed-loop control by means of the communication unit. Therefore, a suction-removal operation which is matched to a temperature of a workpiece surface or to a quantity of material which has been removed from the workpiece can advantageously be achieved by means of the suction-removal apparatus.

In addition, a machine tool, in particular a grinding machine, comprising at least one protection apparatus according to the disclosure is proposed. The machine tool is preferably in the form of a portable machine tool. Here, a "portable machine tool" is intended to be understood to mean, in particular, a machine tool for machining workpieces, which machine tool can be transported by an operator without using a transportation machine. The portable machine tool has, in particular, a mass which is less than 40 kg, preferably less than 10 kg, and particularly preferably less than 5 kg. The machine tool is preferably in the form of an orbital grinder. However, it is also feasible for the machine tool to be in the form of an eccentric grinder, in the form of a belt grinder, in the form of a multipurpose grinder, in the form of a planing machine or in the form of another machine tool, in particular portable machine tool, which would appear to be expedient to a person skilled in the art. Overheating of a workpiece surface of a workpiece during machining with the machine tool can advantageously be at least largely avoided by means of the design according to the disclosure.

Furthermore, it is proposed that the protection apparatus comprises at least one operator control unit for user-specific activation and/or deactivation of the protection apparatus. Here, an "operator control unit" is intended to be understood to mean, in particular, a unit which has at least one component which can be operated directly by an operator and which is provided for influencing and/or changing a process and/or a state of a unit which is coupled to the operator control unit by operation and/or by inputting parameters. The operator control unit can be arranged on the machine tool, in particular on the housing unit of the machine tool. However, it is also feasible for the operator control unit to be in the form of an external unit, for example a smartphone which has an application for subjecting the protection apparatus to open-loop control and/or closed-loop control and which communicates with the open-loop and/or closed-loop control unit by means of the communication unit. Parameters, for example limit values, of the protection apparatus can preferably be set by means of the operator control unit. The operator control unit preferably comprises at least one operator control element for activating and/or deactivating the protection apparatus. Therefore, operator-specific activation and/or deactivation of the protection apparatus can therefore advantageously be made possible depending on requirements, for example deactivation at the request of an experienced operator of the machine tool and activation at the request of an inexperienced operator of the machine tool.

It is further proposed that the operator control unit comprises at least one selector function for selecting types of workpiece, by means of which selector function the protection apparatus can be matched at least to different workpiece materials of workpieces which are to be machined. The operator control unit further preferably has a selector function for selecting a type of insertion tool. The protection apparatus can advantageously be preset for a type of workpiece and/or for a type of insertion tool by means of the design according to the disclosure, wherein at least partially automatic setting of parameters, in particular limit values for actively influencing the motor control system or the like, can be performed. Therefore, the protection apparatus can advantageously be conveniently matched to different types of workpiece and/or types of insertion tool.

In addition, a machine tool system comprising at least one machine tool according to the disclosure and comprising at least one suction-removal apparatus, in particular an external suction-removal apparatus, is proposed, wherein at least the sensor element is arranged in a fluid flow of the suction-removal apparatus which is provided for transporting material which has been removed from the workpiece. Therefore, at least one characteristic variable of a fluid flow which is provided for transporting material which has been removed from the workpiece can be detected in a particularly structurally simple manner.

Furthermore, a method for protecting a workpiece surface against overheating is proposed, wherein, in at least one method step, a characteristic variable of a fluid flow which is provided for transporting material which has been removed from the workpiece is detected. Reliable protection of a workpiece surface of a workpiece, which can be machined by means of the machine tool, against overheating can advantageously be achieved by means of the design according to the disclosure.

The protection apparatus according to the disclosure, the machine tool according to the disclosure, the machine tool system according to the disclosure and/or the method according to the disclosure should not be restricted to the above-described application and embodiment in this case. In particular, the protection apparatus according to the disclosure, the machine tool according to the disclosure, the machine tool system according to the disclosure and/or the method according to the disclosure for fulfilling a manner of operation described in this document can have a number of individual elements, components and units and also method steps which differs from the number cited in this application. In addition, the value ranges indicated in this disclosure and values lying within said limits are intended to be considered to be disclosed and able to be used in any desired manner.

BRIEF DESCRIPTION OF THE DRAWINGS

Further advantages can be gathered from the following description of the drawings. The drawing illustrates an exemplary embodiment of the disclosure. The drawing, the description and the claims contain numerous features in combination. A person skilled in the art will expediently also consider the features individually and combine said features to form meaningful further combinations.

In the Drawings.

DETAILED DESCRIPTION

Figure 1:
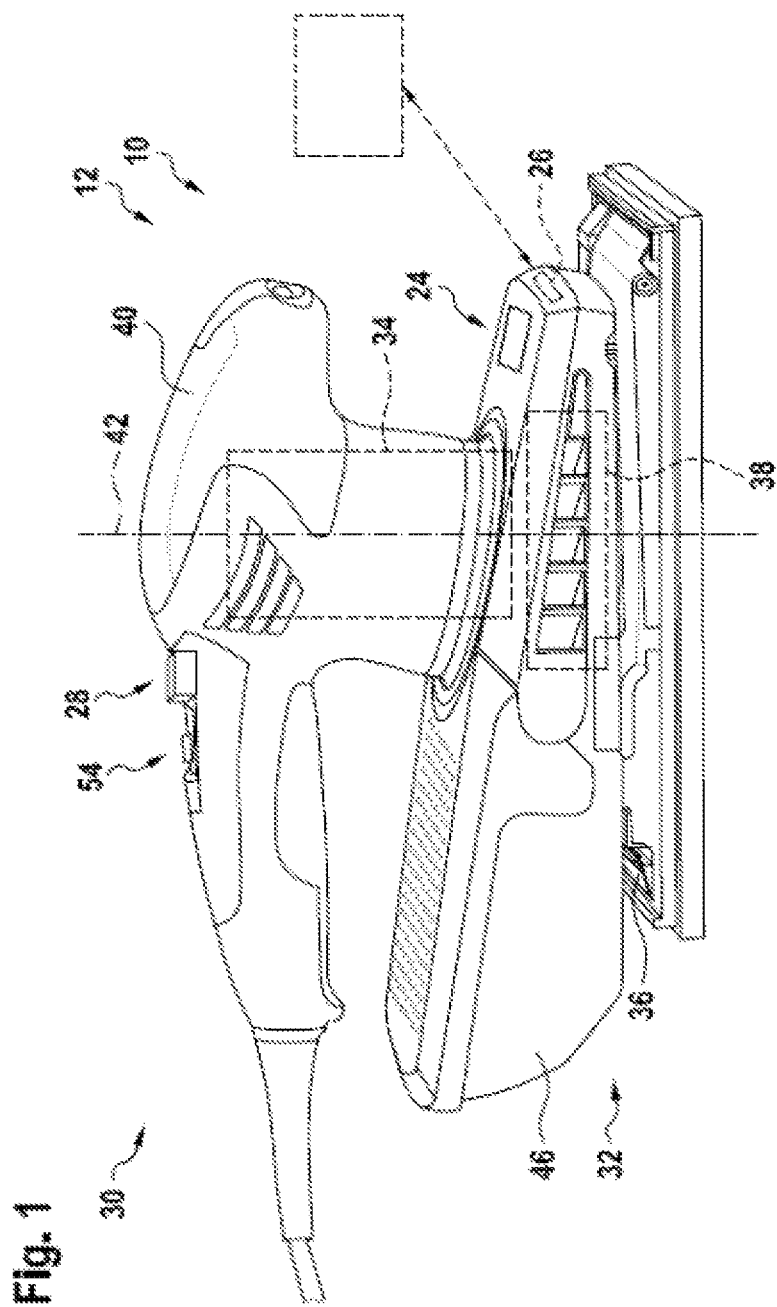
FIG. 1 is a schematic illustration of a machine tool system according to the disclosure comprising at least one machine tool according to the disclosure which comprises at least one protection apparatus according to the disclosure.

FIG. 1 shows a machine tool system 30 comprising at least one machine tool 12 and comprising at least one suction-removal apparatus 32. In the exemplary embodiment illustrated in FIG. 1, the suction-removal apparatus 32 is at least partially integrated into the machine tool 12. In an alternative design, not illustrated, of the machine tool system 30, the suction-removal apparatus 32 is formed separately from the machine tool 12, wherein the suction-removal apparatus 32 is in the form of an external vacuum cleaner which is fluidly connected to the machine tool 12 in a manner which is already known to a person skilled in the art, in particular for removing by suction material which is produced during machining of a workpiece (not illustrated in any detail here) from said workpiece. In the exemplary embodiment illustrated in FIG. 1, the machine tool 12 is in the form of a portable machine tool, in particular in the form of an orbital grinder. However, it is also feasible for the machine tool 12 to have another design which would appear to be expedient to a person skilled in the art.

The machine tool 12 can be operated by a rechargeable battery or can be operated in a wired manner. Furthermore, the machine tool 12 has at least one drive unit 34 which is provided for driving a tool holder 36 of the machine tool 12. Furthermore, the machine tool 12 comprises at least one output unit 38. The drive unit 34 and the output unit 38 are provided for driving the tool holder 36 in a manner which is already known to a person skilled in the art, in particular to drive said tool holder in a rotary manner. The tool holder 36 can be driven so as to eccentrically oscillate about a rotation axis of the tool holder 36 by means of interaction between the drive unit 34 and the output unit 38 in a manner which is already known to a person skilled in the art. However, it is also feasible for the machine tool 12 to be uncoupled from the output unit 38, and for the drive unit 34 to be directly connected to the tool holder 36. The tool holder 36 is in the form of a grinding means holder to which the insertion tool can be fixed by means of a retaining unit of the machine tool 12 in a manner which is already known to a person skilled in the art. The retaining unit can be in the form of a hook-and-loop fastener retaining unit, a clamping retaining unit, a self-adhesive retaining unit etc. The insertion tool is in the form of a grinding disk. However, it is also feasible for the insertion tool to have another design which would appear to be expedient to a person skilled in the art, for example a design as a polishing disk etc. The machine tool 12 further comprises a housing unit 40. The housing unit 40 is provided for accommodating at least the drive unit 34 and the output unit 56.

Figure 2:
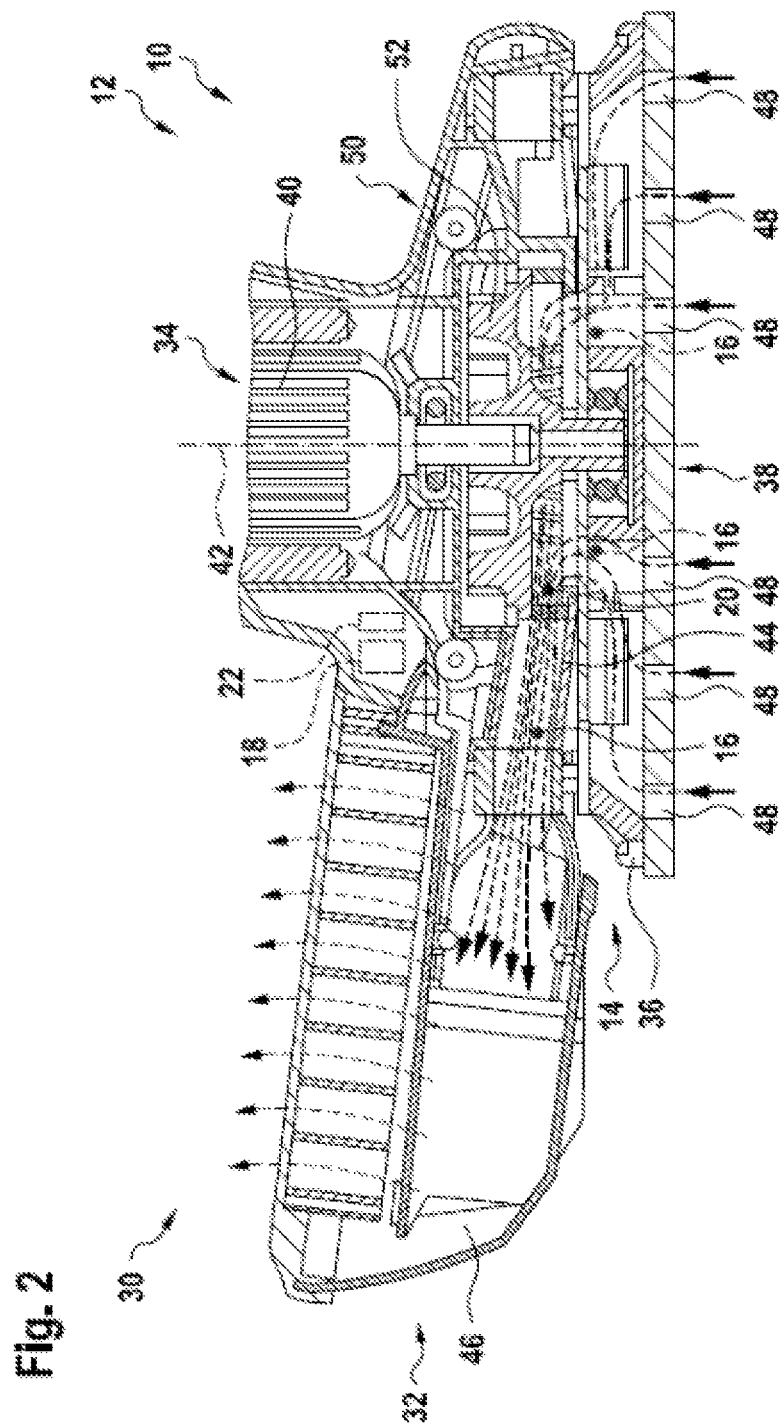
FIG. 2 is a schematic illustration of a sectional view through the machine tool system according to the disclosure.

The rotation axis of the tool holder 36 runs at least substantially parallel to a drive axis 42 of the drive unit 34 (FIG. 2). However, it is also feasible for the rotation axis of the tool holder 36 to run at least substantially transversely to the drive axis 42 of the drive unit 34. The drive unit 34 is in the form of an electric motor unit. The drive axis 42 of the drive unit 34 is formed by a rotation axis of an armature shaft of the drive unit 34. The output unit 38 is provided for mounting the tool holder 36 such that it can move in an eccentric manner relative to the drive axis 42. In this case, the output unit 38 can be switchable in order to influence, for example, an oscillation rate of the tool holder 36.

Furthermore, the machine tool 12 comprises at least one protection apparatus 10 for protecting a workpiece surface of a workpiece, which can be machined by means of the machine tool 12, against overheating (FIG. 2). The protection apparatus 10 for the machine tool 12 is provided at least for protecting a workpiece surface against overheating. The protection apparatus 10 comprises at least one sensor unit 14 which has at least one sensor element 16, and comprises at least one evaluation unit 18 by means of which it is possible to identify at least a temperature of a workpiece surface of a workpiece which can be machined by means of the machine tool 12 at least on the basis of at least one characteristic variable which is detected by means of the sensor unit 14 (FIG. 2). The sensor element 16 is arranged in a fluid flow of the suction-removal apparatus 32, which fluid flow is provided for transporting material which has been removed from a workpiece. The suction-removal apparatus 32 comprises at least one suction-removal nozzle element 44 which is provided for connection to a suction-removal collection container 46 of the suction-removal apparatus 32. The suction-removal collection container 46 can be arranged in a detachable manner on the suction-removal nozzle element 44. The suction-removal collection container 46 has a design which is already known to a person skilled in the art. The sensor element 16 is arranged in a suction-removal channel which is formed by the suction-removal nozzle element 44. As an alternative, it is feasible for the sensor element 16 to be arranged in a region of a suction-removal feed channel which between at least one suction-intake opening 48 in the suction-removal apparatus 32 and the suction-removal nozzle element 44 (alternative positions of the sensor element 16 are illustrated using dashed lines in FIG. 2). The sensor element 16 can also be arranged in the suction-intake opening 48 itself. Further arrangements of the sensor element 16 which would appear to be expedient to a person skilled in the art for detecting at least one characteristic variable of the fluid flow are likewise feasible. The suction-intake opening 48 in the suction-removal apparatus 32 is arranged in the tool holder 36. The suction-removal apparatus 32 comprises a large number of suction-intake openings 48 which are arranged in the tool holder 36. The suction-intake openings 38 are preferably arranged in the tool holder 36 in a uniformly distributed manner. However, it is also feasible for the suction-intake openings 48 to be arranged in the tool holder 36 in a non-uniformly distributed manner.

In order to generate the fluid flow which is provided for transporting material which has been removed from a workpiece, the suction-removal apparatus 32 comprises at least one fan unit 50.

The fan unit 50 comprises at least one fan impeller 52. The fan impeller 52 can be driven by means of the drive unit 34, in particular can be driven so as to rotate about the drive axis 42. However, it is also feasible for the suction-removal apparatus 32 to comprise a separate drive unit which is provided for driving the fan impeller 52. In addition to generating the fluid flow which is provided for transporting material which has been removed from a workpiece, the fan unit 50 can be provided for generating a further fluid flow which is provided for cooling the drive unit 34. However, it is also feasible for the machine tool 12 to have at least one cooling fan impeller (not illustrated in any detail here), which can be driven by means of the drive unit 34, for generating a further fluid flow which is provided for cooling the drive unit 34.

The sensor element 16 detects at least one characteristic variable of the fluid flow which is provided for transporting material which has been removed from a workpiece. The sensor element 16 detects at least a temperature of the fluid flow and/or a change in temperature of the fluid flow. The sensor element 16 is in the form of a temperature sensor element. However, as an alternative or in addition, it is also feasible for the sensor element 16 to detect further characteristic variables of the fluid flow which is provided for transporting material which has been removed from a workpiece.

Furthermore, the sensor unit 14 has at least one further sensor element 20 which detects at least one volumetric flow rate characteristic variable of the fluid flow. The volumetric flow rate characteristic variable can be in the form of a flow rate of the fluid flow, in the form of a volumetric flow rate of the fluid flow, in the form of a rotation speed of the drive unit 34 for generating the fluid flow, in the form of a current of the drive unit 34 for generating the fluid flow, in the form of a fan impeller rotation speed of the fan unit 50 for generating the fluid flow or in the form of another volumetric flow rate characteristic variable which would appear to be expedient to a person skilled in the art. The further sensor element 20 is in the form of a flow sensor. The further sensor element 20 is provided at least for detecting a flow rate of the fluid flow.

Furthermore, the protection apparatus 10 comprises at least one open-loop and/or closed-loop control unit 22 which actively influences at least one motor control system depending on at least one characteristic variable which is detected by means of the sensor unit 14. The open-loop and/or closed-loop control unit 22 is provided for actively intervening in the motor control system when a limit value, in particular a temperature limit value and/or a temperature gradient limit value, are/is reached, exceeded and/or undershot. The open-loop and/or closed-loop control unit 22 is provided for reducing a rotation speed of the drive unit 34, deactivating the drive unit 34 and/or actively braking the drive unit 34 at least depending on at least one characteristic variable which is detected by means of the sensor unit 14. In a design of the suction-removal apparatus 32 with a separate drive unit, the open-loop and/or closed-loop control unit 22 is provided for increasing a rotation speed of the separate drive unit, in order to increase a volumetric flow rate of the fluid flow and to enable cooling of a workpiece surface, at least depending on at least one characteristic variable which is detected by means of the sensor unit 14.

In addition, the protection apparatus 10 comprises at least one output unit 24 for outputting at least one item of information depending on at least one characteristic variable which is detected by means of the sensor unit 14 (FIG. 1). The output unit 24 is arranged on the housing unit 40. The open-loop and/or closed-loop control unit 22 is provided for driving the output unit 24 at least depending on at least one characteristic variable which is detected by means of the sensor unit 14. Therefore, an operator can advantageously be informed of overheating or potential overheating of a workpiece surface.

Furthermore, the protection apparatus 10 comprises at least one communication unit 26 for communicating with at least one external unit (merely illustrated as a black box in FIG. 1). The external unit can be in the form of an external suction-removal apparatus, in the form of a smartphone with an installed operator control application for subjecting the protection apparatus 10 to open-loop control and/or closed-loop control, or in the form of another external unit which would appear to be expedient to a person skilled in the art. By way of example, limit values for activating intervention by the open-loop and/or closed-loop control unit 22 into the motor control system are possible by means of the external unit.

Furthermore, the protection apparatus 10 comprises at least one operator control unit 28 for user-specific activation and/or deactivation of the protection apparatus 10 (FIG. 1). The operator control unit 28 can be at least partially integrally formed with or be separate from an operator control apparatus 54 of the machine tool 12. The operator control apparatus 54 of the machine tool 12 is provided at least for putting the drive unit 34 into operation, in particular for supplying current or interrupting a current flow. In addition, the operator control apparatus 54 of the machine tool 12 can be provided for setting a rotation speed or further characteristic variables of the drive unit 34.

The operator control unit 28 of the protection apparatus 10 comprises at least one selector function for selecting types of workpiece, by means of which selector function the protection apparatus 10 can be matched at least to different workpiece materials of workpieces which are to be machined. Furthermore, the operator control unit 28 of the protection apparatus 10 comprises at least one selector function for selecting types of insertion tool, by means of which selector function the protection apparatus 10 can be matched at least to different types of insertion tool, for example to a removal rate, a particle size or the like, of the insertion tool.

A method for protecting a workpiece surface against overheating comprises at least one method step in which a characteristic variable of a fluid flow is detected by means of a sensor unit 14, which fluid flow is provided for transporting material which has been removed from the workpiece. The evaluation unit 18 of the protection apparatus 10 identifies at least a temperature of a workpiece surface in at least one method step on the basis of the at least one detected characteristic variable of the sensor unit 14. In at least one method step of the method, at least one item of information is output by means of the output unit 24 depending on the at least one detected characteristic variable of the sensor unit 14. In at least one method step of the method, a motor control system is actively influenced by means of the open-loop and/or closed-loop control unit 22 depending on the at least one detected characteristic variable of the sensor unit 14. Overheating of a workpiece surface can advantageously be at least largely prevented.

Therefore, a workpiece can advantageously be precisely machined, in particular even by inexperienced operators of the machine tool 12.

What is claimed is:

1. A protection apparatus of a machine tool for protecting at least a workpiece surface against overheating, comprising:
    at least one sensor unit including at least one sensor element that detects at least one characteristic variable of a fluid flow provided for transporting material removed from a workpiece; and
    at least one evaluation unit that enables identifying at least one temperature of a workpiece surface of the workpiece to be machined by the machine tool based at least in part upon the at least one characteristic variable detected via the at least one sensor unit,
    wherein the at least one sensor unit further includes at least one further sensor element that detects at least one characteristic volumetric flow rate variable of the fluid flow.

2. The protection apparatus according to claim 1, wherein the at least one sensor element detects at least one of a temperature of the fluid flow and a change in temperature of the fluid flow.

3. The protection apparatus according to claim 1, further comprising:
    a control unit that actively influences at least one motor control system with reference to the at least one characteristic variable detected via the at least one sensor unit;
    wherein the control unit is configured to operate in at least one of an open-loop and a closed loop fashion.

4. The protection apparatus according to claim 1, further comprising at least one output unit configured to output at least one item of information based at least in part upon the at least one characteristic variable detected via the at least one sensor unit.

5. The protection apparatus according to claim 1, further comprising at least one communication unit configured to communicate with at least one external unit.

6. A machine tool system, comprising:
    a machine tool that includes
        at least one protection apparatus that has:
            at least one sensor unit with at least one sensor element that detects at least one characteristic variable of a fluid flow provided for transporting material removed from a workpiece; and
            at least one evaluation unit that enables identifying at least one temperature of a workpiece surface of the workpiece to be machined by the machine tool based at least in part upon the at least one characteristic variable detected via the at least one sensor unit; and
        at least one suction removal apparatus configured to provide the fluid flow,
    wherein the at least one sensor element is positioned in the fluid flow.

7. The machine tool system according to claim 6, wherein the protection apparatus further has at least one operator control unit configured to selectively activate and deactivate the protection apparatus.

8. The machine tool system according to claim 7, wherein the operator control unit has at least one selector function that enables a selection of a type of workpiece, and that is configured to match the protection apparatus to at least different workpiece materials of workpieces that are to be machined.

9. The machine tool system according to claim 6, wherein the at least one sensor element detects at least one of a temperature of the fluid flow and a change in temperature of the fluid flow.

10. The machine tool system according to claim 6, wherein the at least one sensor unit further includes at least one further sensor element that detects at least one characteristic volumetric flow rate variable of the fluid flow.

11. The machine tool system according to claim 6, wherein the at least one protection apparatus further comprises:
    a control unit configured to actively influence at least one motor control system with reference to the at least one characteristic variable detected via the at least one sensor unit, the control unit configured to operate in at least one of an open-loop and a closed loop fashion.

12. The machine tool system according to claim 6, wherein the at least one protection apparatus further comprises:
    at least one output unit configured to output at least one item of information based at least in part upon the at least one characteristic variable detected via the at least one sensor unit.

13. The machine tool system according to claim 6, wherein the at least one protection apparatus further comprises:
    at least one communication unit configured to communicate with at least one external unit.

* * * * *